Sept. 16, 1952 G. W. SCHATZMAN 2,610,866
FENDER SHIELD MOUNTING
Filed April 12, 1947 2 SHEETS—SHEET 1
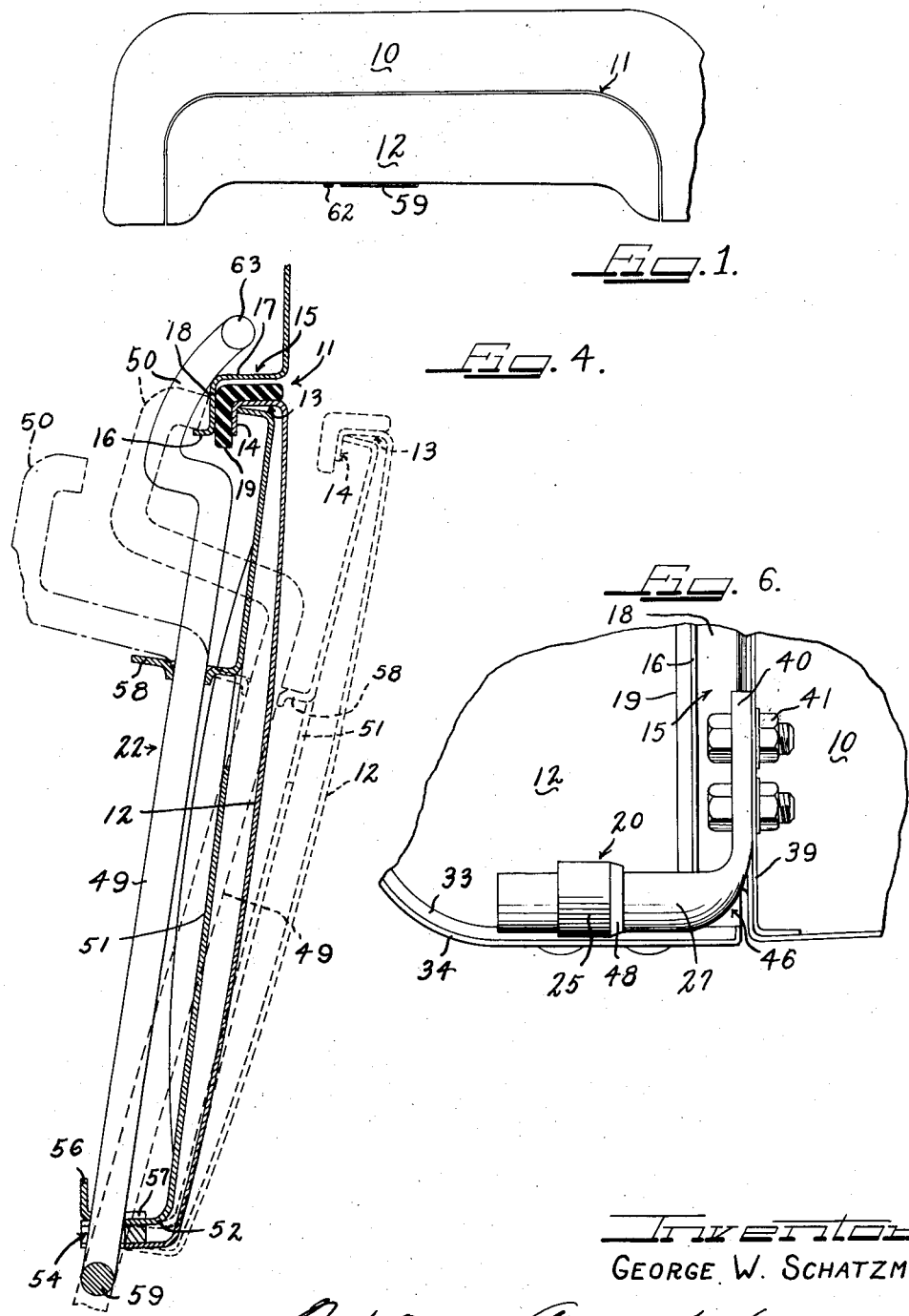
Inventor
GEORGE W. SCHATZMAN.

Sept. 16, 1952 G. W. SCHATZMAN 2,610,866
FENDER SHIELD MOUNTING
Filed April 12, 1947 2 SHEETS—SHEET 2
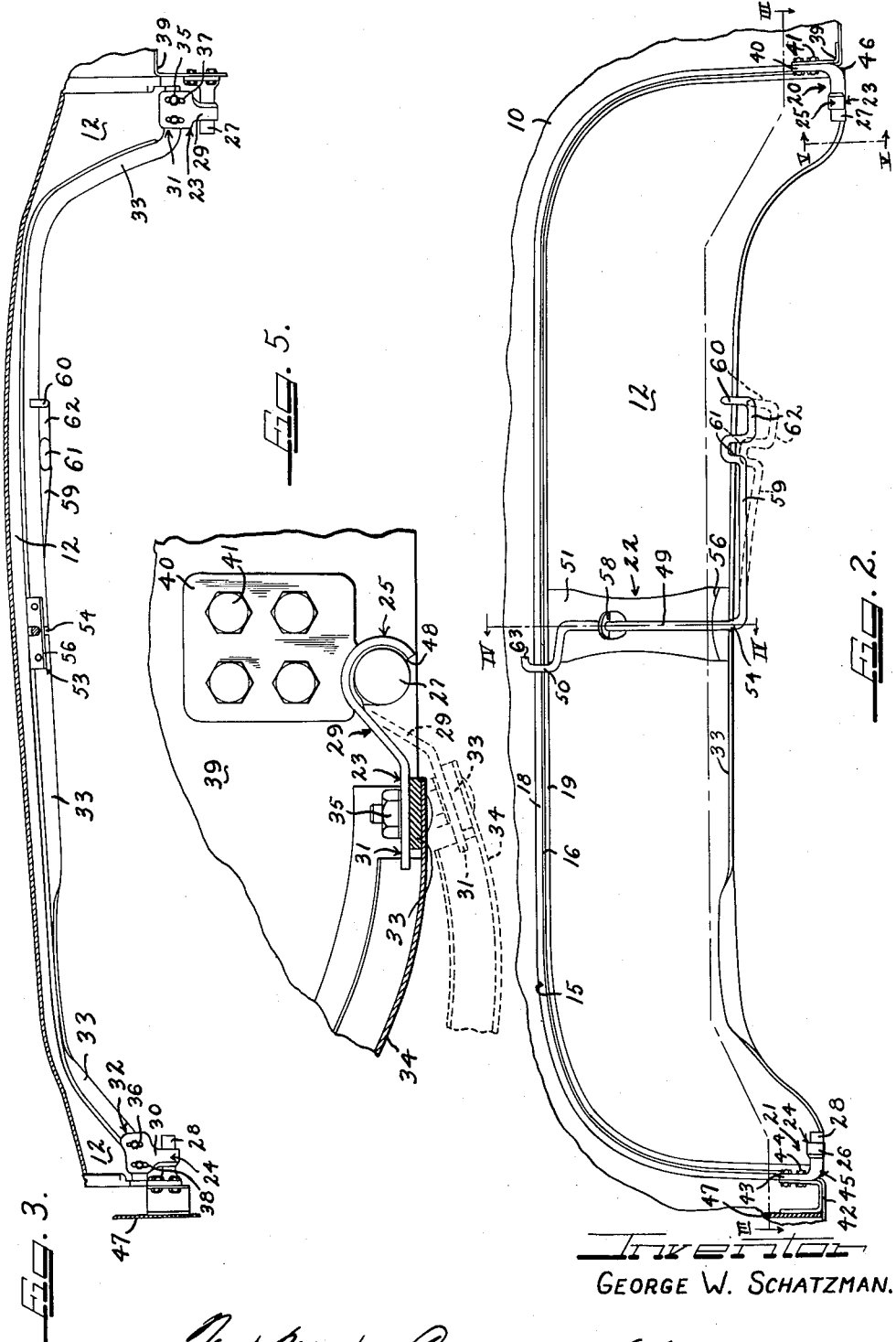
Inventor
GEORGE W. SCHATZMAN.

Patented Sept. 16, 1952

2,610,866

UNITED STATES PATENT OFFICE 2,610,866

FENDER SHIELD MOUNTING

George W. Schatzman, Detroit, Mich., assignor to Houdaille-Hershey Corporation, Detroit, Mich., a corporation of Michigan Application April 12, 1947, Serial No. 741,103

5 Claims. (Cl. 280—153)

This invention relates to fender and fender skirt or shield assemblies, and more particularly to an improved assembly of this character including novel means for attaching the fender and fender shield together.

In the vehicle industry, and particularly in the automobile industry, various means have been utilized to improve the appearance of vehicle fenders. The usual vehicle fender is provided with an opening which affords access to the vehicle wheel, and which permits the ready removal or replacement of the wheel in an axial direction. Since this opening inherently presents an unattractive outward appearance, detachable fender shields have been employed to cover the opening.

As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether such fender be separated from the vehicle body part, partly separated from the vehicle body part, or actually an integral part of the vehicle body, and whether or not it projects outwardly from the principal body portion of the vehicle.

An important object of the present invention is to provide a novel fender and fender shield assembly in which the fender shield is secured to the fender in a novel manner.

Another object of the invention is to provide a fender shield having improved means for attaching the same to a fender.

A further object of the invention is to provide a novel structure for detachably securing the fender shield to a fender.

Still another object of the invention is to provide new and improved means whereby a fender shield is adapted to be mounted with ease and dispatch in a simple, easily understood and readily executed maneuver.

Other objects, features and advantages of this invention will be readily apparent from the following detailed description of a preferred embodiment thereof taken in conjunction with the accompanying drawings, in which:

Figure 1 is a side elevational view of a fender and fender shield assembly embodying the features of the present invention;

Figure 2 is an enlarged inside elevational view of a fender shield and contiguous portion of a fender;

Figure 3 is a horizontal sectional view taken substantially on the line III—III of Figure 2;

Figure 4 is an enlarged vertical sectional view taken substantially on the line IV—IV of Figure 2;

Figure 5 is an enlarged fragmentary detail sectional view taken substantially on the line V—V of Figure 2; and Figure 6 is an enlarged fragmentary detail elevational view of the lower right-hand corner of Figure 2.

Having reference to Figures 1 and 2, a fender 10 having a wheel access opening 11 is adapted to have assembled therewith in closing relation a fender shield 12. In the particular form disclosed, the fender shield 12 is of the type which lies flush with the outer face of the margin of the fender about the wheel access opening 11 and has about its end and upper margin an inturned marginal reinforcing flange 13 (Figure 4) including a further inturned reinforcing terminal flange portion 14.

The margin of the fender defining the wheel access opening 11 may be formed with an inturned generally Z-shaped reinforcing flange 15 including an inturned reinforcing terminal flange portion 16. An inturned portion 17 and a downturned portion 18 of the flange 15 are at generally right angles to each other providing a rabbet groove receptive of the flange 13 of the fender shield and a rubber cushioning gasket 19 of right angular cross section mounted thereon. The fender shield 12 thus lies flush with the face of the margin of the fender about the wheel access opening 11.

According to the present invention, the fender shield 12 is held in place in closing relation to the fender opening 11 by attachment at three spaced points so arranged that the ends and upper margin of the fender shield, in the fully mounted relation, are maintained in snug engagement with the marginal flange 15 of the fender defining the wheel access opening 11. To this end, the forward end of the fender shield has attachment structure 20, the rear end of the fender shield has attachment structure 21, and the center portion of the fender shield is equipped with attachment structure 22.

The front and rear attachment structures 20 and 21 are of such character that the fender shield 12 can be preliminarily assembled with the fender 10 by a simple manual maneuver, and thereafter the final assembled relationship of the center shield and fender effected and the central attachment structure 22 rendered operative to maintain the assembled condition.

The front and rear attachment structures 20 and 21, respectively, are of a nature to effect an assembled relationship with the fender 12 by a simple hook-on engagement manipulation of the fender shield 12 with the attachment structures as a preliminary step in the assembly and then swinging of the fender shield to the final assembled relationship with the fender. Accordingly, the front and rear end attachment structures 20 and 21 comprise respective hook-shaped brackets 23 and 24 which extend inwardly substantially at right angles to the fender shield 12. At their outer extremities, the brackets 23 and 24 have respective down-turned hook portions 25 and 26 adapted to engage pins 27 and 28 attached to the fender and projecting into the wheel opening 11.

The inner portions of the brackets 23 and 24 comprise integral attachment necks 29 and 30 which are angled toward the fender shield 12 and are formed with flat attachment arms or flanges 31 and 32. These arms 31 and 32 are fashioned to be of substantially complementary shape and lie upon the adjacent end portions of a reinforcing bar 33 (Figures 3, 5 and 6) on the fender shield which is carried by a lower marginal inwardly extending reinforcing flange 34 on the fender shield. The attachment flanges or arms 31 and 32 are secured in assembly with the reinforcing bar 33 and the fender shield reinforcing flange 34 by means such as bolts 35 and 36. The attachment flanges 31 and 32 have longitudinal slots 37 and 38 respectively (Figure 3), through which the bolts 35 and 36 extend, and by which reciprocal adjustment of the respective brackets 31 and 32 may be effected to insure a tight fit of the fender shield and the fender with the outer surfaces thereof substantially flush.

At the front end of the fender the pin 27 may be secured to the wheel housing 39 by means of a bracket structure including an integral attachment flange or arm 40 which is angled upwardly at substantially 90° to the pin 27 and secured to the wheel housing 39 by means of bolts 41. The rear pin 28 has an integral attachment flange or arm 43 which may be attached to a baffle plate bracket 42 by means of bolts 44. The front bracket 46 including the pin 27 and the integral attachment flange 40 may be substantially similar to the rear bracket 45 except for the difference due to its extending in the opposite direction. The baffle plate bracket 42 may be secured to a baffle plate 47 in any suitable manner.

In order to minimize the undesirable effects of "freezing" or sticking of the hook-shaped brackets 23 and 24 to the respective pins 27 and 28 due to corrosion or splashed-on material, or the like, the area of contact therebetween is limited by the provision of an angularly inturned pin-engaging flange 48 on the outer edge of the hook portion 25 of the front bracket 23 and a similar flange 48 on the rear hook bracket 24. These flanges provide a relatively thin line edge surface bearing on the pins 27 and 28 at the edges of the hook portions 25 and 26 remote from the free ends of the pins.

In the preliminary assembly of the fender shield 12 with the fender 10, the attachment hook-shaped brackets 23 and 24 are manipulated to engage the pins 27 and 28 at the lower front and rear corners, respectively, of the wheel opening 11 (see dotted position in Figure 5). From this preliminarily assembled relationship, the fender shield 12 is swung about the general axis provided by the end supporting pins 27 and 28 toward or away from the fender 10, at least within ample limits for effecting assembly and removal of the fender shield. For example, the hooks 25 and 26 may include a 240° arc, permitting about 90° rotation of the fender shield toward a horizontal position without disengaging from the pins.

It is desirable that the fender shield 12 be snugly engaged about its end and upper margin with the fender. Adjustment of the inward extent of the brackets 23 and 24, as permitted by the sliding bolted attachment thereof to the fender shield (Figure 3), can be effected so that when the fender shield is swung into full engagement with the fender, the outer surface thereof will be drawn flush with the fender 10.

After the fender shield 12 has been rocked into fully assembled relation with the fender, the central attachment structure 23 is actuated to complete the attachment of the fender shield. As best shown in Figs. 2 and 4, this central attachment structure comprises a rotary clamping rod 49 mounted on a vertical axis and adapted to be turned to swing an eccentric clamping head 50 into engagement with the marginal reinforcing flange 15 at the top of the wheel access opening 11 in the fender. To this end, a vertical clamping rod supporting, central reinforcing bar or strut 51, which may be formed from sheet metal, is secured to the inner side of the fender shield 12. The bar 51 is secured at its upper end within the marginal reinforcing flange 13 of the fender shield and at its lower end is formed with a right angle foot flange 52 resting upon and secured to the lower marginal reinforcing bar 33, as well as the reinforcing flange 34, as by means of rivets 53 (Figure 3). The foot flange and the underlying portion of the reinforcing bar 33, as well as the reinforcing flange 34 is slotted inwardly as indicated at 54 to accommodate the lower end portion of the vertical extent of the clamping rods 49 as a bearing.

A retaining plate 56 of angular section is secured upon the foot flange and formed with a counterpart outwardly opening slot 57 for receiving the rod and providing a retaining bar across the inner end of the bearing slot 54.

Adjacent to the clamping head 50, and approximately spaced below the upper edge of the supporting bar 51 is an inwardly struck out bearing ear 58. To afford a sliding bearing for the clamping rod 49 for both rotary and reciprocal axial sliding movement, the bearing ear 58 is centrally apertured. Furthermore, the location of the bearing ear 58 is such that in the nonactive position of the clamping rod, the eccentric clamping head 50 is adapted to rest upon the bearing ear substantially as shown in dot-dash outline in Figure 4. In this position the head clears the margin of the fender defining the access opening 11 and the fender shield can be rocked into and out of engaging position with the fender.

The lower end portion of the clamping rod 49 is formed with an angularly extending handle portion 59 which is disposed at such an angle relative to the clamping head 50 that when the handle extends outwardly, the clamping head 50 is free from clamping engagement with the reinforcing flange 15 of the fender. When the handle 59 is swung forwardly and inwardly the head 50 swings outwardly toward the clamping engagement. The weight of the clamping rod 49 causes it normally to tend to drop slidably down with the clamping head 50 resting on the bearing ear 58.

After the fender shield 12 has been swung into engagement with the fender, the handle 59 is manipulated to slide the clamping rod 49 upwardly until the clamping head 50 is opposite the reinforcing flange 15 whereupon the rod is given a turn to carry the clamping head into clamping engagement with the reinforcing flange 15. Thereupon, the handle 59 is pushed inwardly behind the lower reinforcing flange 34 of the fender shield as permitted by a certain degree of flexure thereof, substantially as indicated in Figure 3, until a right angular locking terminal 60 on the handle clears the fender shield flange 34 and the handle is then flexed upwardly until the locking terminal engages over the reinforcing bar 33. This holds the clamping rod 49 locked.

As a reinforcing expedient and also as a tensioning device, the handle 59 is formed adjacent to but slightly spaced from the locking terminal 60 with an upward bend 61 which is adapted in the locked condition of the clamping rod to engage against the inner edge of the reinforcing bar 33 and the lower marginal fender shield reinforcing flange 34. This maintains the handle 59 under tension and also serves to limit the outward movement of the end portion of the handle.

For convenience in manipulation of the same, the handle is formed with a finger-engageable, generally downwardly extending loop 62 (Fig. 2) intermediate the terminal 60 and the tensioning loop 61.

When it is desired to remove the fender shield 12 the finger loop 62 is engaged and the handle 59 flexed inwardly until the locking terminal 60 clears the lower marginal reinforcing flange 34 of the fender shield whereupon the handle is flexed downwardly until the limiting and flexure loop 61 clears the fender shield reinforcing flange 34, substantially as shown in broken outline in Figure 2. Then the handle 59 is swung outwardly to release the clamping head 50 from clamping engagement with the fender and reinforcing flange 15. This causes a hook terminal 63 on the clamping head to swing into engagement with the flange 15 or the marginal reinforcing flange portion 16, substantially as shown in dash outline in Figure 4. In this position the fender shield 12 is permitted to swing partially open as indicated in the dash outline but is restrained against free outward swinging. The person handling the fender shield is thereby given time to grasp the same with both hands at the lower edge for manipulating the fender shield to release the hook-shaped brackets 23 and 24 from the pins 27 and 28. As an incident to such release, the upper end of the fender shield is first swung back toward the fender so that the retaining hook 63 will clear the fender flange 15 whereupon the clamping head 50 promptly drops down to the bearing ear 58 so that the clamping head will clear the flange 50 and the fender shield can be swung out and removal completed.

After the fender shield has been removed, it can be laid upon its back and the hook-shaped brackets 23 and 24 and the clamping head 50 or at least the bearing ear 58 will cooperate to provide a substantially tripod support for the fender shield which will keep the same above the surface upon which the fender shield is laid and thereby protect the edges of the fender shield from damage, scratching or denting thereof as might be caused by an object upon which the edge might be laid.

It will, of course, be understood that various details of construction may be varied over a wide range without departing from the principles of this invention, and it is, therefore, not the purpose to limit the patent hereon otherwise than necessitated by the scope of the appended claims.

I claim as my invention:

1. In combination in a fender and fender shield assembly, the fender having a wheel access opening and the fender shield being adapted to close said opening, respective attaching structures for the ends of the fender shield, and an intermediate attaching structure for the intermediate portion of the fender shield, said end attaching structures comprising respective hook-shaped brackets mounted on the fender shield and means on the fender providing bearing pins extending into said wheel access opening and engaged by the brackets, said brackets having their pin-engaging hooks of approximately 240° engagement arcs to permit approximately 90° pivotal swinging of the fender shield into and out of engagement with the fender.

2. In combination in a fender and fender shield assembly, the fender having a wheel access opening and the fender shield being adapted to close said opening, respective attaching structures for the ends of the fender shield, and an intermediate attaching structure for the intermediate portion of the fender shield, said end attaching structures comprising respective hooks having their width disposed horizontally and mounted on the fender shield and means on the fender providing bearing pins extending into said wheel access opening and engaged by the brackets, said hooks having respective side flanges projecting downwardly and providing relatively thin line surfaces bearing on said pins and maintaining the major opposing surface areas of the pins and hooks spaced apart.

3. In combination in a fender and fender shield assembly, the fender having a wheel access opening and the fender shield being adapted to close said opening, a hook carried by said fender shield and extending inwardly, the fender including a baffle, a first bracket supported by said baffle and a second bracket attached to said first bracket, and said hook being engageable with said second bracket to attach the fender shield to the fender and to rock said fender shield in said opening.

4. In combination in a fender and fender shield assembly, means for securing the fender shield to the fender comprising a hook member mounted on the fender shield, means on the fender affording a bearing support for the hook, and flange means on said hook for limiting the extent of contact between said hook and said bearing means.

5. In combination in means for attaching a fender shield to a fender, a strap-type hook member having an attachment base portion and a hook portion, said attachment portion being adapted to be secured in horizontal plane upon the lower portion of a fender shield to project inwardly therefrom, and a supporting member comprising an attachment base adapted to be secured to a part of a fender and a pin projecting generally horizontally therefrom and adapted to project into position for engagement by the hook portion of said hook member in fully assembled relationship, said hook portion having flange means for direct engagement with the pin and limiting the extent of contact between said hook portion and said pin.

GEORGE W. SCHATZMAN.

REFERENCES CITED

The following references are of record in the file of this patent:

UNITED STATES PATENTS

| Number | Name | Date |
|---|---|---|
| Re. 21,083 | Lyon | May 16, 1939 |
| 679,887 | Clark | Aug. 6, 1901 |
| 875,047 | Bursik | Dec. 31, 1907 |
| 1,172,582 | Chittenden | Feb. 22, 1916 |
| 1,420,724 | Marona et al. | June 27, 1922 |
| 1,608,380 | Farley | Nov. 23, 1926 |
| 1,954,919 | Carey | Apr. 17, 1934 |
| 2,277,488 | Haltenberger | Mar. 24, 1942 |
| 2,312,536 | Fergueson | Mar. 2, 1943 |
| 2,334,867 | Fergueson | Nov. 23, 1943 |